US012226923B2

(12) United States Patent
Bozikis et al.

(10) Patent No.: US 12,226,923 B2
(45) Date of Patent: Feb. 18, 2025

(54) RAZOR CARTRIDGE

(71) Applicant: Bic Violex S.A., Anoixi (GR)

(72) Inventors: Ioannis Bozikis, Anoixi (GR); Christos Galanis, Anoixi (GR); Charalampos Schizas, Anoixi (GR); Christos Ampatis, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 613 days.

(21) Appl. No.: 17/424,546

(22) PCT Filed: Jan. 29, 2020

(86) PCT No.: PCT/EP2020/052166
§ 371 (c)(1),
(2) Date: Jul. 21, 2021

(87) PCT Pub. No.: WO2020/157132
PCT Pub. Date: Aug. 6, 2020

(65) Prior Publication Data

US 2022/0118635 A1 Apr. 21, 2022

(30) Foreign Application Priority Data

Jan. 31, 2019 (EP) .................................... 19154896

(51) Int. Cl.
*B26B 21/40* (2006.01)
*B26B 21/56* (2006.01)

(52) U.S. Cl.
CPC ........ *B26B 21/4031* (2013.01); *B26B 21/565* (2013.01)

(58) Field of Classification Search
None
See application file for complete search history.

(56) References Cited

U.S. PATENT DOCUMENTS 6,216,349 B1 * 4/2001 Gilder .................. B26B 21/222 30/346.5
6,295,734 B1 * 10/2001 Gilder ................ B26B 21/4031 70/52

(Continued)

FOREIGN PATENT DOCUMENTS

CA 2879886 A1 * 1/2014 ......... B26B 21/4031
EP 2731759 B1 7/2013

(Continued)

OTHER PUBLICATIONS

English translation of KR-102067749-B1, Jan. 17, 2020.*

(Continued)

*Primary Examiner* — Hwei-Siu C Payer
(74) *Attorney, Agent, or Firm* — Bookoff McAndrews, PLLC

(57) ABSTRACT

A razor cartridge comprising a first blade support and a second blade support, each of the first and second blade supports include a flat portion having a lower surface and a front end. A support plane S is tangent to the respective front ends of the first and second blade supports and the lower surface faces away from the support plane S. A first blade is attached to the lower surface of the flat portion of the first blade support. The first blade includes a first cutting edge. A second blade is attached to the lower surface of the flat portion of the second blade support. The second blade includes a second cutting edge. The first and second cutting edges are offset with respect to the support plane S.

14 Claims, 3 Drawing Sheets

3A 3B 3C

(56) References Cited

U.S. PATENT DOCUMENTS

| | | | |
|---|---|---|---|
| 6,438,846 B1 | | 8/2002 | Alsaifi |
| 7,669,335 B2 | | 3/2010 | Walker et al. |
| 8,117,753 B2 | * | 2/2012 | Gilder .................. B26B 21/227 30/50 |
| 8,225,510 B2 | | 7/2012 | Peterson et al. |
| 2010/0269351 A1 | * | 10/2010 | Gilder ................. B26B 21/4018 30/50 |
| 2014/0259677 A1 | | 9/2014 | Coresh |
| 2017/0057106 A1 | * | 3/2017 | Worrick, III ........ B26B 21/4012 |
| 2017/0203451 A1 | * | 7/2017 | Griffin .................. B26B 21/565 |
| 2018/0071930 A1 | | 3/2018 | Walker, Jr. et al. |
| 2022/0118635 A1 | * | 4/2022 | Bozikis ................. B26B 21/565 |

FOREIGN PATENT DOCUMENTS

| | | | | |
|---|---|---|---|---|
| EP | 2707180 | B1 | | 12/2016 |
| JP | 5719755 | B2 | | 5/2015 |
| KR | 102067749 | B1 | * | 1/2020 |
| WO | WO 95/09071 | | * | 4/1995 |
| WO | WO 2012/158141 | A1 | * | 11/2012 |
| WO | 2016007329 | A1 | | 1/2016 |

OTHER PUBLICATIONS

International Search Report and Written Opinion in corresponding Application No. PCT/EP2020/052166, dated Apr. 2, 2020 (13 pages).

* cited by examiner

[Fig. 1]
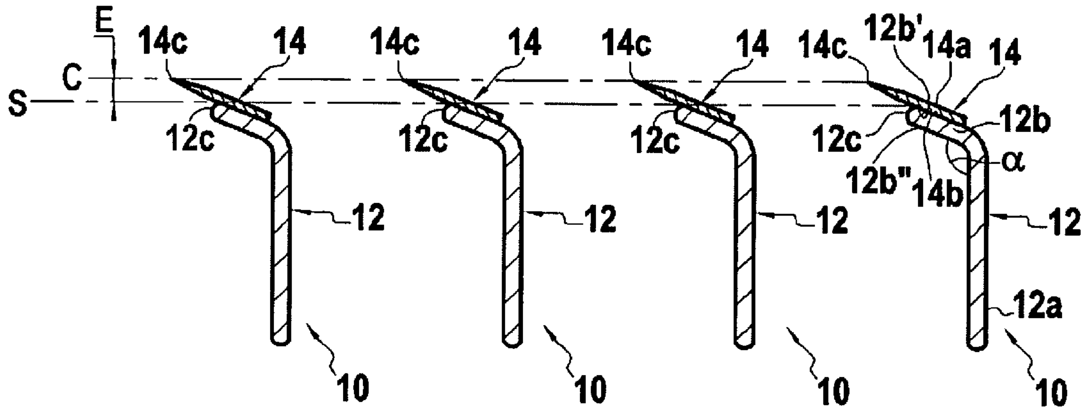
PRIOR ART
[Fig. 2]
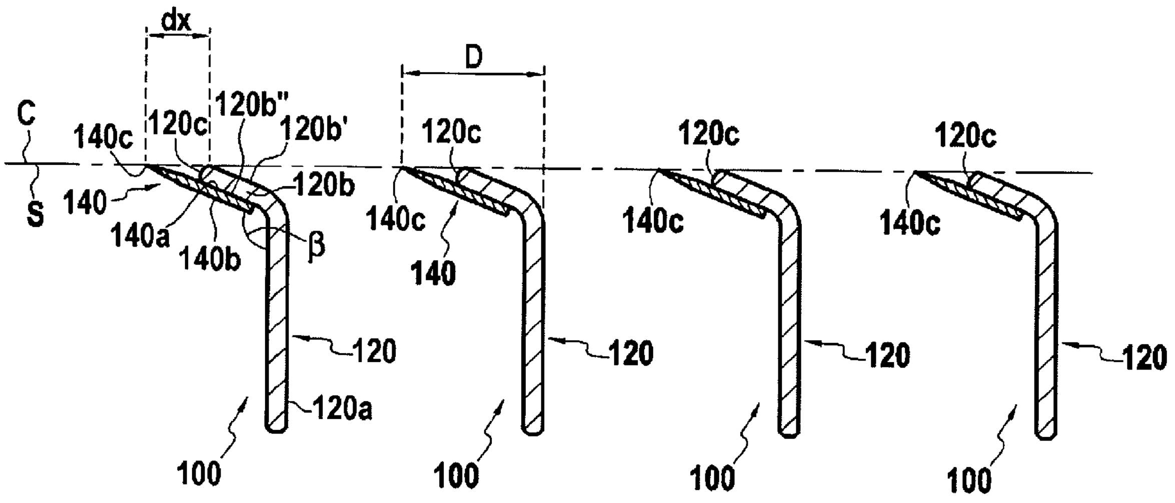

[Fig. 3A-3C]
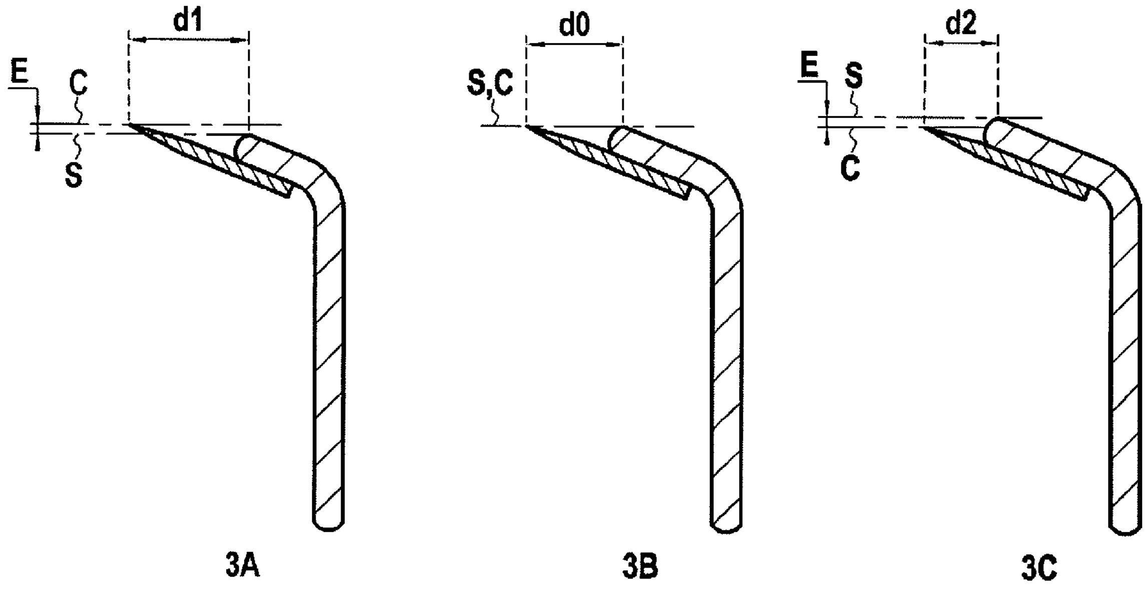

[Fig. 4A]
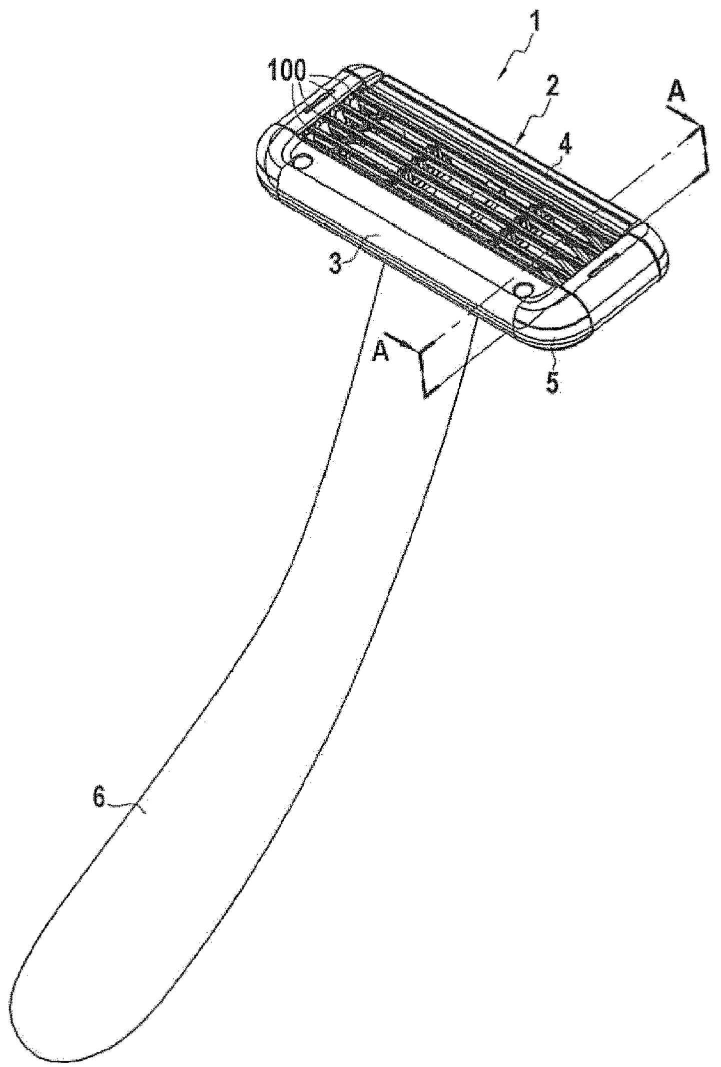
[Fig. 4B]
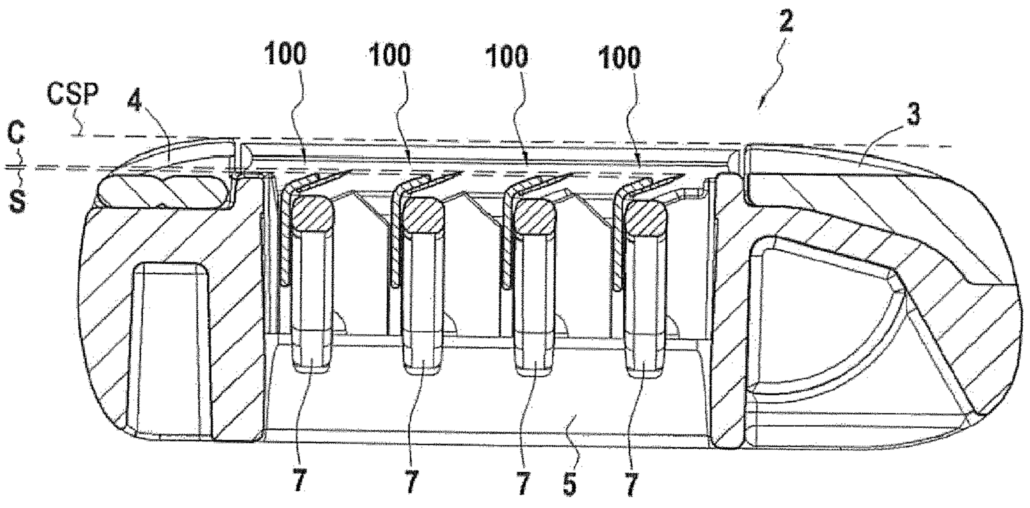

RAZOR CARTRIDGE

CROSS-REFERENCE TO RELATED APPLICATION(S)

This application is a National Stage Application of International Application No. PCT/EP2020/052166, filed on 29 Jan. 2020, now published as WO/2020/157132, and which claims priority to European Patent Application No. EP 19154896.5, filed on 31 Jan. 2019, entitled “RAZOR CARTRIDGE”, the entire contents of which are incorporated herein by reference.

BACKGROUND

1. Field

The following description relates to razor cartridges for a shaving devices, and more particularly to a razor cartridge having at least two blade assemblies that can have a positive or negative exposure relative to a support plane.

2. Description of Related Art

Shaving devices generally include a head unit having at least one or more cutting members or blades retained therein. The at least one or more cutting members or blades have cutting edges that are aligned in parallel when retained within the head unit.

Conventional shaving heads include a blade mounted on the upper surface of a blade support. The upper surface being understood as flat portion of the blade support which faces the shaving surface when in use. To avoid nicks and cuts using these configurations it is known to bring blade assemblies closer to each other. This also reduces the sense of irritation and enhances the glideness experience of the user during shaving. Document U.S. Pat. No. 8,117,753 discloses shaving heads having average inter-blade span not greater than 1.25 mm.

However, an inter-blade span smaller than 1.25 mm is a relatively small inter-blade span involving relatively small space available for water and shaving debris to flow between the cutting members and out of the razor (and shaving surface), i.e., rinsability.

Another method is to incorporate a separate spring element or adjustment element to control the exposure of the blade assemblies relative to the housing of the shaving head. Conventionally, a shaving plane is defined as a tangential line intersecting the first and second skin contact points (or simpler the highest points) of the shaving head. This is typically between the cap and guard on the housing of the shaving head.

SUMMARY

The present disclosure provides a razor cartridge comprising a first blade support and a second blade support, each of the first and second blade supports include a flat portion having a lower surface and a front end. A support plane is tangent to the respective front ends of the first and second blade supports and the lower surface faces away from the support plane. A first blade is attached to the lower surface of the flat portion of the first blade support. The first and second blade supports include a base portion extending at an angle from the flat portion. The first blade includes a first cutting edge. A second blade is attached to the lower surface of the flat portion of the second blade support. The second blade includes a second cutting edge. The first and second cutting edges are offset with respect to the support plane.

The first and second cutting edges may have first and second cutting edge exposures that are between −80 μm to +80 μm with respect to the support plane.

The first and second cutting edge exposures may be between −45 μm to +45 μm with respect to the support plane.

At least one of the first and second cutting edge exposures may be negative with respect to the support plane.

At least one of the first and second cutting edge exposures may be positive with respect to the support plane.

A first distance between the first cutting edge and front end of the first blade support and/or a second distance between the second cutting edge and front end of the second blade support may be within a range of 0.3 to 0.7 mm.

The first and/or second distance may be between 0.4 to 0.6 mm.

The first and second distances may be the same.

The first and second distances may be different.

One or more front ends may be rounded.

A distance between the first cutting edge and the second cutting edge may be between 1.6 mm to 2.2 mm.

The angle β between the first and second blade supports base portion and flat portion may be within a range of 104° to 120°.

The razor cartridge may further comprise a third and a fourth blade support, each of the third and fourth blade supports may include a flat portion having a lower surface and a front end. The support plane may be tangent to the respective front ends of the third and fourth blade supports and the lower surfaces may face away from the support plane. The third and fourth blade supports include a base portion extending at an angle from the flat portion. A third blade may be attached to the lower surface of the flat portion of the third blade support. The third blade may include a third cutting edge. A fourth blade may be attached to the lower surface of the flat portion of the fourth blade support. The fourth blade may include a fourth cutting edge. The third and fourth cutting edges may be offset with respect to the support plane.

A third distance between the third cutting edge and front end of the third blade support and/or a fourth distance between the fourth cutting edge and front end of the fourth blade support may be within a range of 0.3 to 0.7 mm.

The third and fourth cutting edges may have respectively a third cutting edge exposure and a fourth cutting edge exposure that may be in the range between −80 μm to +80 μm with respect to the support plane.

According to the current disclosure a shaving head wherein the cutting element is mounted on the lower surface of the support (the surface facing away from a shaving surface when in use) and the cutting edge exposure is offset relative to a support plane defined by the front ends of the blade supports rather than the shaving head is provided. These configurations reduce the occurrence of nicks and cuts by providing additional contact points which increases the surface area that the shaving force is applied over the skin during shaving.

Furthermore, providing negative and/or positive cutting edge exposures enhances the control of the pressure applied to the skin. Positive cutting edge exposure results in a more aggressive shaving and therefore more pressure applied onto the skin by the cutting edge, while a negative cutting edge exposure applies a lower pressure to the skin and thus is better, e.g. for sensitive skin. This allows razor cartridges to be customized according to the various user needs and/or desires. For example, for users with sensitive skin a razor cartridge with negative cutting edge exposure would be more suitable, while a razor cartridge with positive cutting edge exposure would be more suitable for users mainly interested in a closer shaving with fewer strokes needed.

These configurations provide a large opening or spacing between the blades (IBS). Effective removal of the shaving debris and shaving foam during the shaving experience is achieved. This leads to less need for rinsing the shaver during a shaving experience as the increased IBS allows for a continuous flow of water, shaving debris, shaving foam thereby reducing the occurrence of clogging which improves the overall shaving experience because the shaving debris can now flow easily through the larger opening during shaving. This means that longer shaving strokes or more shaving strokes can be done before rinsing is needed. In addition, a user may not need to agitate or bang the shaver to dislodge debris during rinsing. This extends lifetime of the shavers, particularly as banging of the shaver to dislodge debris may undesirably change blade exposure.

BRIEF DESCRIPTION OF THE DRAWINGS

FIG. 1 details a side view of a plurality of blade assemblies of a conventional razor having the blades mounted on the upper surface (surface facing the shaving surface) of the blade support.

FIG. 2 details a side view of a plurality of blade assemblies having the blades mounted on the lower surface (surface facing away from a shaving surface) of the blade support.

FIG. 3A details a blade assembly from FIG. 2 having the blade positioned in a positive exposure configuration.

FIG. 3B details a blade assembly from FIG. 2 having the blade positioned in a neutral configuration.

FIG. 3C details a blade assembly from FIG. 2 having the blade positioned in a negative exposure configuration.

FIG. 4A details a perspective view of a shaver including a handle and a razor cartridge including the plurality of blade assemblies of FIG. 2.

FIG. 4B details a cross-section of the razor cartridge of FIG. 4A along plane A.

DETAILED DESCRIPTION

FIG. 1 shows a plurality of a conventional blade assemblies, each blade assembly 10 includes a blade support 12 and a blade 14.

The blade support 12 may include a base portion 12*a* and a flat portion 12*b*. The flat portion 12*b* may have a front end 12*c*. The flat portion 12*b* may extend at an angle α relative to the base portion 12*a*. The flat portion 12*b* may have an upper surface 12*b*' and a lower surface 12*b*" opposite the upper surface 12*b*'.

The blade 14 may include an upper surface 14*a*, a lower surface 14*b* opposite the upper surface 14*a*, and a cutting edge 14*c*. The lower surface 14*b* of the blade 14 may be attached to the upper surface 12*b*' of the blade support 12.

Furthermore, a support plane S is defined by a tangent line to the front ends 12*c* of the blade supports. A cutting plane C is defined by a tangent line intersecting the cutting edges 14*c* of the blades 14. A cutting edge exposure E is defined as the vertical distance between the cutting plane C and the support plane S.

In this configuration shown in FIG. 1, the cutting edge 14*c* is the only point of contact with skin during a shaving experience. This configuration can thus place excess blade pressure on the skin, which can lead to nicks and cuts.

Shown in FIG. 2 is a plurality of blade assemblies according to the present disclosure, each blade assembly 100 includes a blade support 120 and blade 140.

The blade support 120 may include a base portion 120*a* and a flat portion 120*b*. The flat portion 120*b* may have a front end 120*c*. The front end 120*c* may be flat or rounded. An aspect of having a rounded front end 120*c* is that it further increases the sliding of the blade assembly on the skin (shaving surface). This further contributes to improve glideness.

The flat portion 120*b* may extend at an angle β relative to the base portion 120*a*. The angle β between the flat portion 120*b* and the base portion 120*a* may be, for example, between 104° to 120°. The flat portion 120*b* may have an upper surface 120*b*' that in use is a skin-facing surface and a lower surface 120*b*" opposite the upper surface 120*b*'. The lower surface 120*b*" in use faces away from a shaving surface, i.e. it faces away from the support plane S.

The blade 140 may include an upper or skin-facing surface 140*a*, a lower surface 140*b* opposite the upper surface 140*a*, and a cutting edge 140*c*. The upper surface 140*a* of the blade 140 may be attached to the lower surface 120*b*" of the blade support 120. The blade 140 may have a thickness between 0.04-0.12 mm.

In this configuration shown in FIG. 2, the front end 120*c* and the cutting edge 140*c* both act as points of contact with skin during a shaving operation. This configuration thus places less localized blade pressure on the skin, which reduces nicks and cuts. This is because the pressure on the skin is applied through more and different contacting points, particularly having as skin contacting point the blade support front end reduces nicks and cuts and irritation as the blade support has no cutting edge at all.

FIG. 2 further shows a distance D, defined as a horizontal distance between a back side (facing away from the blade) of the base portion 120*a* of the blade support and the blade cutting edge 140*c*. Embodiments of the present disclosure distance D may be between 0.9 mm-1.3 mm and more specifically 1.0 mm-1.2 mm. Distance D is correlated with the positioning of the cutting edge and consequently to the cutting edge exposure relative to the support plane S.

As shown in FIGS. 3A-3C, an exposure of the cutting edge 140*c* may be configured to be negative, positive, or neutral relative to the support plane S depending on the needs of the consumer. This is controlled by the parameter dx (d0, d1, d2, d3, . . . ) defined as the distance between the cutting edge 140*c* of the blade 140 and the front end 120*c* of the blade support 120 along an axis that is parallel to the support plane S.

It is envisioned that all of the blade assemblies in a shaving head have the same distance dx, or same exposure. However, it is also envisioned that the blade assemblies in a shaving head have different distances dx and thus different exposures. For example, a shaving head may have a series of blade assemblies with increasing cutting edge exposure from the leading end to the trailing end of the shaving head.

If cutting edge is aligned with (or positioned at) the support plane (FIG. 3B) the cutting edge exposure is considered neutral (do), if the cutting edge is above the support plane (FIG. 3A) the cutting edge exposure is considered positive (d1), and if the cutting edge is below the support plane S (3C) the cutting edge exposure is considered negative (d2). The range of distance dx may be between 0.3 to 0.7 mm and more specifically between 0.4 to 0.6 mm. The distance dx correlates with the cutting edge exposure E thus a range of the cutting edge exposure may be between −80 μm to +80 μm and more specifically between −45 μm to +45 μm.

It has been found that cutting edge exposures being negative or positive, i.e. not being neutral, may be desired in circumstances. For example, when the cutting edge exposure is negative relatively to the support plane S, a less aggressive shave is achieved. This is because the front end 120*c* of the blade support helps protect the shaving surface, e.g. skin, since the front end 120*c* of the flat portion 120*b* comes first in contact with the skin during shaving operation and then the blade cutting edge 140*c* follows contacting the skin. Therefore, the likelihood of irritation is decreased. Additionally, the life span of the blades is prolonged. For example, when the cutting edge exposure is positive relative to the support plane S, closeness and glideness is improved although skin irritation tends to be increased.

In particular, adjusting the cutting edge exposure facilitates enhanced control of the pressure applied to the skin. Positive cutting edge exposure results in a more aggressive shaving and therefore more pressure applied onto the skin by the cutting edge, while a negative cutting edge exposure applies a lower pressure to the skin and thus is better e.g. for sensitive skin. This allows razor cartridges to be customized according to the various user needs and/or desires. For example, for users with sensitive skin a razor cartridge with negative cutting edge exposure would be more suitable, while a razor cartridge with positive cutting edge exposure would be more suitable for users mainly interested in a closer shaving with fewer strokes needed. Razor cartridges combining negative and positive cutting edge exposures may also be foreseen.

It has been found that with the described ranges an effective balance between closeness and less irritation is succeeded.

Shown in FIG. 4A is a shaver 1 including a handle 6 and a razor cartridge 2 including the plurality of blade assemblies 100 mounted in a head unit 5.

Shown in FIGS. 4A and 4B is an exemplary razor cartridge 2 including a shaving head unit 5 having movable shaving blade assemblies 100. In examples, it is envisioned that any suitable number of blades may be used, for example two or more blades. In examples, the shaving blade assemblies 100 may be fixed blades. Including multiple blade assemblies, e.g. four shaving blade assemblies 100, expedites the shaving experience as well as extends the life of the razor head.

The razor cartridge 1 may have a guard bar 3 and a rear cap 4. In examples, the razor cartridge 1 may not include the guard bar 3 and/or rear cap 2. FIG. 4B shows the cutting plane C, the support plane S, in comparison with a conventional shaving plane CSP that is a tangent line intersecting the guard bar 3 and the cap 4.

In the shaving direction, the guard bar 3 is shown in front of the blade assemblies 100 and the rear cap 4 is provided behind the blade assemblies 100.

The razor cartridge 2 may include at least two resilient elements 7 (for example spring fingers) elastically biasing each blade assembly 100 towards a rest position. In examples where the razor cartridge 2 includes a different number of blade assemblies 100, a corresponding number of resilient elements 7 may be foreseen. Accordingly, the blade assemblies 100 may be movable under forces encountered during shaving. The resilient elements 7 may be molded as a single piece with the head unit 5.

As aforementioned, the razor cartridge 2 may include fixed blade assemblies 100 that may not have resilient elements 7.

It has been found that a razor cartridge 2 including movable blade assemblies, as shown in the example of FIG. 4B, the pressure applied to the skin of a user during shaving by the cutting edge 140*c* is of about 10 times lower than a pressure exerted by conventional razor cartridges.

In some examples of herein disclosed configurations a distance between consecutive cutting edges of adjoining blade assemblies (inter-blade span, IBS) may for example be between 1.6 mm to 2.2 mm, more specifically from 1.70 mm to 2 mm and most specifically from 1.75 to 1.95 mm. In an example, the IBS may be 1.85 mm ±0.1 mm. This provide for a razor cartridge that is less prone to clogging thereby reducing rinsing necessity at the same time as customized razor cartridges may be provided.

An aspect of these examples is that a manufacturer can use existing standard head units traditionally used for housing five blade to house four blade assemblies. This can reduce the cost of razor cartridges while performance is at least maintained or even improved. Furthermore, if the blade assemblies are incorporated into existing standard head units, the manufacturer does not need to make major changes to their existing manufacturing process, therefore reducing the costs associated with a change over.

The invention claimed is:

1. A razor cartridge comprising:

a first blade support, a second blade support, and a third blade support, each of the first, second, and third blade supports including a flat portion having a lower surface a front end, wherein a support plane is tangent to the respective front ends of the first, second, and third blade supports, and the lower surface faces away from the support plane;

wherein each of the first, second, and third blade supports includes a base portion extending at an angle from the flat portion;

a first blade attached to the lower surface of the flat portion of the first blade support, wherein the first blade includes a first cutting edge;

a second blade attached to the lower surface of the flat portion of the second blade support, wherein the second blade includes a second cutting edge;

a third blade attached to the lower surface of the flat portion of the third blade support, wherein the third blade includes a third cutting edge;

wherein the first, second, and third cutting edges are offset with respect to the support plane, wherein the third cutting edge is offset from the support plane in a direction opposite the direction the lower surface of the third blade support faces, and wherein a distance between the first cutting edge and the second cutting edge is between 1.6 mm to 2.2 mm.

2. The razor cartridge of claim 1, wherein the first cutting edge has a first cutting edge exposure and the second cutting edge has a second cutting edge exposure, wherein each of the first cutting edge exposure and the second cutting edge exposure is between −80 μm to +80 μm with respect to the support plane.

3. The razor cartridge of claim 2, wherein the first and second cutting edge exposures are between −45 μm to +45 μm with respect to the support plane.

4. The razor cartridge of claim 2, wherein at least one of the first and second cutting edge exposures is negative with respect to the support plane.

5. The razor cartridge of claim 2, wherein at least one of the first and second cutting edge exposures is positive with respect to the support plane.

6. The razor cartridge of claim 1, wherein a first distance between the first cutting edge and the front end of the first blade support and/or a second distance between the second cutting edge and the front end of the second blade support are/is within a range of 0.3 to 0.7 mm.

7. The razor cartridge of claim 6, wherein the first and/or second distance are/is between 0.4 to 0.6 mm.

8. The razor cartridge of claim 6, wherein the first and second distances are the same.

9. The razor cartridge of claim 6, wherein the first and second distances are different.

10. The razor cartridge of claim 1, wherein one or more of the front ends is rounded.

11. The razor cartridge of claim 1, wherein the angle between the base portion and the flat portion is within a range of 104° to 120°.

12. The razor cartridge of claim 1, further comprising a fourth blade support and a fifth blade support, each of the fourth and fifth blade supports including a flat portion having a lower surface and a front end, wherein the support plane is tangent to the respective front ends of the fourth and fifth blade supports and the lower surfaces face away from the support plane; wherein each of the fourth and fifth blade supports includes a base portion extending at an angle from the flat portion;

a fourth blade attached to the lower surface of the flat portion of the fourth blade support, wherein the fourth blade includes a fourth cutting edge; and a fifth blade attached to the lower surface of the flat portion of the fifth blade support, wherein the fifth blade includes a fifth cutting edge;

wherein the fourth and fifth cutting edges are offset with respect to the support plane.

13. The razor cartridge of claim 12, wherein a third distance between the fourth cutting edge and the front end of the fourth blade support and/or a fourth distance between the fifth cutting edge and the front end of the fifth blade support are/is within a range of 0.3 mm to 0.7 mm.

14. The razor cartridge of claim 12, wherein the fourth and fifth cutting edges have respectively a fourth cutting edge exposure and a fifth cutting edge exposure that are in the range between −80 μm to +80 μm with respect to the support plane.

* * * * *